UNITED STATES PATENT OFFICE.

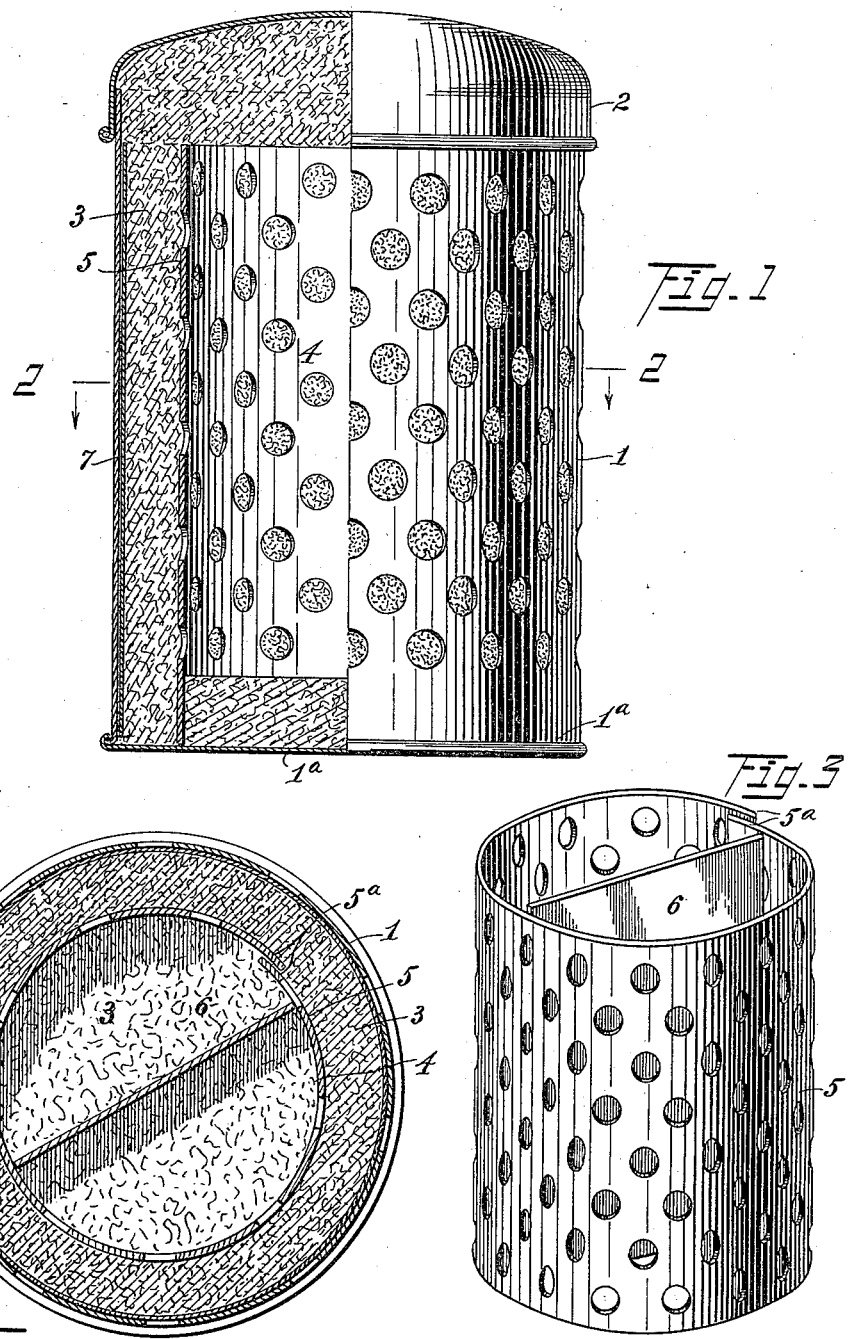

FRANK P. RAND, OF SPOKANE, WASHINGTON, ASSIGNOR OF ONE-HALF TO CHARLES F. PENN, OF SPOKANE, WASHINGTON.

POISON-RECEPTACLE.

1,013,514. Specification of Letters Patent. Patented Jan. 2, 1912.

Application filed July 3, 1911. Serial No. 636,687.

*To all whom it may concern:*

Be it known that I, FRANK P. RAND, a citizen of the United States, residing at Spokane, in the county of Spokane and State of Washington, have invented certain new and useful Improvements in Poison-Receptacles, of which the following is a specification.

My invention relates to improvements in poison receptacles or containers, and is particularly designed and adapted for use as a safety container or holder for poison fly paper in the destruction of flies and other insects, vermin, and the like, and at the same time affords a convenient receptacle for storing and handling the poison while in use, particularly the liquid so that the latter is kept out of the reach of children; as well as preventing the poison fluid from being drank by cats, dogs, and other domestic animals as is often the case where ordinary moistened fly paper is left exposed or unprotected in its ordinary use.

A further object of the invention is to provide an exceedingly simple, cheap, efficient, and economical safety receptacle or holder having a lining of suitable absorbent material adapted to absorb the liquid poison and preserve the same from undue evaporation and at the same time presenting a moistened exposed surface.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a view, partly in section and partly in side elevation, of a poison receptacle or holder constructed in accordance with my invention. Fig. 2, a cross sectional view, taken on line 2—2 of Fig. 1. Fig. 3, is a perspective view of the perforated metallic inner wall or lining and locking member serving to retain the absorbent material in place.

Similar numerals of reference designate like parts throughout all the figures of the drawings.

The improved poison receptacle or holder comprises a perforated container or body 1, preferably of cylindrical form, and provided with an imperforate bottom portion 1$^a$, and an imperforate cap or cover 2.

The perforated container or body is provided with a lining of absorbent material 3, forming a liquid or fluid receptacle 4, and extending above and below the bottom and cover portions 1$^a$, and 2, respectively.

The absorbent material may comprise any suitable and convenient substance such as felt, wicking, or the like, and as a means for removably securing and retaining the same within the container, a perforated inner wall or lining cylinder 5, is provided, said inner wall or lining preferably comprising a perforated metallic strip bent into cylindrical form and having overlapping free vertical edges 5$^a$, forming a retaining lining for the absorbent material, said wall or lining being adapted to be adjusted and locked therein by means of a locking member or vertical strip 6, mounted within and extending between the walls of the cylindrical lining and the bottom and cover portions of said container, as shown.

The poison fly paper 7, is bent into cylindrical form and arranged as a layer or lining immediately within the perforated cylindrical portion 1, of the container as shown, after which the lining or filling of absorbent material 3, may be introduced, the latter being retained in position by means of a perforated split cylinder 5, and locking member 6, above described.

The layer of fly paper 7, and absorbent material 5, may be kept moistened by introducing liquid into the liquid receptacle 4, at suitable intervals, and if desired, the fly paper 7, may be dispensed with by impregnating the absorbent material 3, with suitable poisonous substances or chemicals or by introducing a suitable liquid poison within the liquid receptacle 4, through the medium of the removable cap or cover 2.

From the foregoing description, taken in connection with the accompanying drawings, the operation and advantages of my invention will be readily understood.

Having thus described an embodiment of my invention what I claim and desire to secure by Letters Patent, is,—

1. A poison receptacle, comprising a perforated container provided with an imperforate bottom and cover, a lining of absorbent material forming a fluid receptacle, and a perforated open ended metallic lining therein.

2. A poison receptacle, comprising a perforated cylindrical container, a removable cover, a lining of absorbent material forming a fluid receptacle, a perforated split cylinder, and a locking member for removably retaining said split cylinder within said receptacle.

3. A poison receptacle, comprising a perforated cylindrical container provided with an imperforate bottom and a removable cover, a lining of poison impregnated material forming a fluid receptacle, an open ended perforated lining within said receptacle and having overlapping free vertical edges, and a vertical locking strip mounted in said receptacle and interposed between the walls of said perforated lining whereby the latter is retained in position.

4. A poison receptacle, comprising a perforated cylindrical container having an imperforate bottom and cover, a layer of fly paper within the perforated cylindrical portion of said container, a wall of absorbent material covering said fly paper and arranged above and below said bottom and cover forming a liquid receptacle, a perforated metallic strip bent into cylindrical form within said receptacle and forming a retaining lining for said absorbent material, and a vertical locking strip mounted within and extending between the walls of said cylindrical lining and the bottom and cover portions of said container.

In testimony whereof I have affixed by signature in presence of two witnesses.

FRANK P. RAND.

Witnesses:
ELLOF MYRE,
L. F. RUH.

---

Copies of this patent may be obtained for five cents each, by addressing the "Commissioner of Patents, Washington, D. C."